June 19, 1928. 1,674,563
W. OGILVIE
INDEXING MEANS FOR AUTOMATIC TURNING AND SCREWING MACHINES
Filed March 16, 1927 2 Sheets-Sheet 1

INVENTOR
William Ogilvie
BY
ATTORNEY

June 19, 1928. 1,674,563
W. OGILVIE
INDEXING MEANS FOR AUTOMATIC TURNING AND SCREWING MACHINES
Filed March 16, 1927 2 Sheets-Sheet 2

INVENTOR
William Ogilvie
BY
ATTORNEY

Patented June 19, 1928.

1,674,563

UNITED STATES PATENT OFFICE.

WILLIAM OGILVIE, OF SOLIHILL, ENGLAND, ASSIGNOR TO B. S. A. TOOLS LIMITED, OF BIRMINGHAM, ENGLAND.

INDEXING MEANS FOR AUTOMATIC TURNING AND SCREWING MACHINES.

Application filed March 16, 1927, Serial No. 175,835, and in Great Britain December 9, 1926.

This invention relates to improvements in turning and screwing machines of the kind wherein a bar of stock is intermittently fed forward the required distance to form an article such as a screw or the like, and is held by the jaws of a revolving chuck, and successively operated on by a series of tools carried by a tool holder comprising a turret mounted on a turret slide, the latter being adapted to have imparted thereto a reciprocating movement whereby the tools are slowly moved into operative contact with the work and then quickly returned therefrom, and the turret has imparted thereto a step by step turning movement whereby the tools are successively moved into position for operative contact with the work piece.

In machines of the aforesaid kind the turret which forms a support for a series of tools, is moved or indexed to bring the tools successively into position for operation on the work piece or stock. In one well known form of such machine the indexing mechanism comprises a radially slotted disc or plate which is fixed to one end of the turret spindle and arranged to be engaged by a crank, which is also mounted on the turret slide, the said crank being carried by a disc secured to a shaft mounted on the turret slide, and suitable trip gear operating a one revolution and stop mechanism connected by suitable gearing with the crank shaft. The crank shaft has a single revolution intermittently imparted thereto whereby the crank is brought into engagement with one of the radial slots in the disc fixed to the turret spindle and imparts to the turret head a partial forward revolution, thus moving the series of tools successively into operative position. The gearing employed for turning the crank shaft is arranged to permit a reciprocating movement to be imparted to the turret slide for the purpose of moving the tools carried by the turret head into and out of contact with the work piece or stock, such being effected in any suitable known manner. The turret head is usually adapted to carry about six different tools and the indexing mechanism corresponds to the number of tools for which the turret head is adapted.

It will be readily understood that, when it is desired to produce, in a machine of the aforesaid kind, an article or piece of work on which only two operations are to be performed and only two tools are required for that purpose, there would be a considerable loss of time in the period occupied by the intermittent forward rotary movement of the turret head to bring the tools into operative position in each cycle of movement, and the output of the machine would be correspondingly restricted. To overcome the aforesaid objection it has been proposed to provide means whereby the turret head is indexed two or more times in rapid succession after it has been returned and before the next cutting operation takes place, also it has been proposed to provide means whereby a back and forth part turning movement is imparted to the turret head.

The object of this invention is to provide, in an automatic turning and screwing machine of the aforesaid kind, and wherein a turret head is adapted to carry a series of tools and to have imparted thereto an intermittent forward rotary movement, improved and simplified means whereby the turret head, when fitted with two tools, may have imparted thereto a back and forth part rotary movement, whereby the said tools are alternately moved into operative position.

The invention contemplates the employment of indexing mechanism for the turret head comprising a pair of radially slotted discs slidably keyed upon the turret head spindle, and adapted to be alternately moved into engagement with cranks formed on the outer faces of a pair of bevel pinions interposed between the said discs, one of the said pinions being free and the other fixed to the crank shaft, and said pinions being driven in opposite directions by an intermeshing bevel pinion actuated by suitable gearing, whereby a back and forth part turning movement is imparted to the turret head spindle and the turret head.

The invention also contemplates the provision of means for imparting sliding movement to the radially slotted discs on the turret head spindle.

Other features of this invention will be clearly pointed out in the claims appended hereto.

In order that the invention may be clearly understood and readily carried into effect, we will describe same more fully with reference to the accompanying drawings, in which:—

Figure 4:
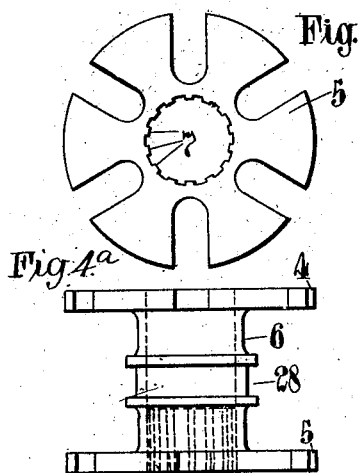

Figures 4 and 4ª are, respectively, an end elevation and a plan view of the pair of radially slotted discs.

Figure 5:

Figures 5 and 5ª are, respectively, an end elevation and a plan view of fluted sleeve adapted to slidably key the slotted discs on the turret head spindle.

Figure 6:
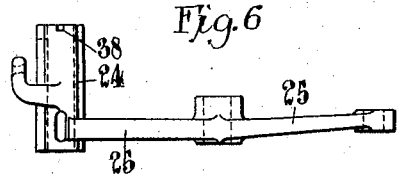

Figures 6 and 6ª are, respectively, an end elevation and a plan view of the lever employed for imparting sliding movement to the radially slotted discs.

Figure 7:
Figure 7:
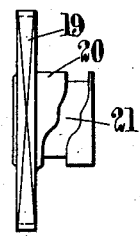

Figure 7 is a side view of the cam device which is adapted to impart rocking movement to the disc operating lever.

Figure 8:
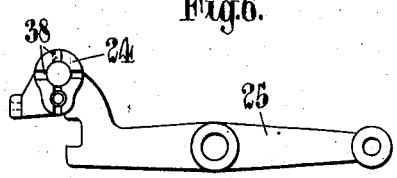
Figure 8:
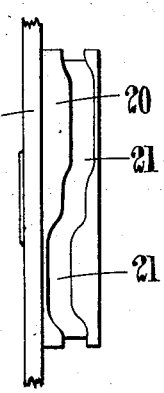

Figure 8 shows a development of the cam device shown in Figure 7.

Figure 1:
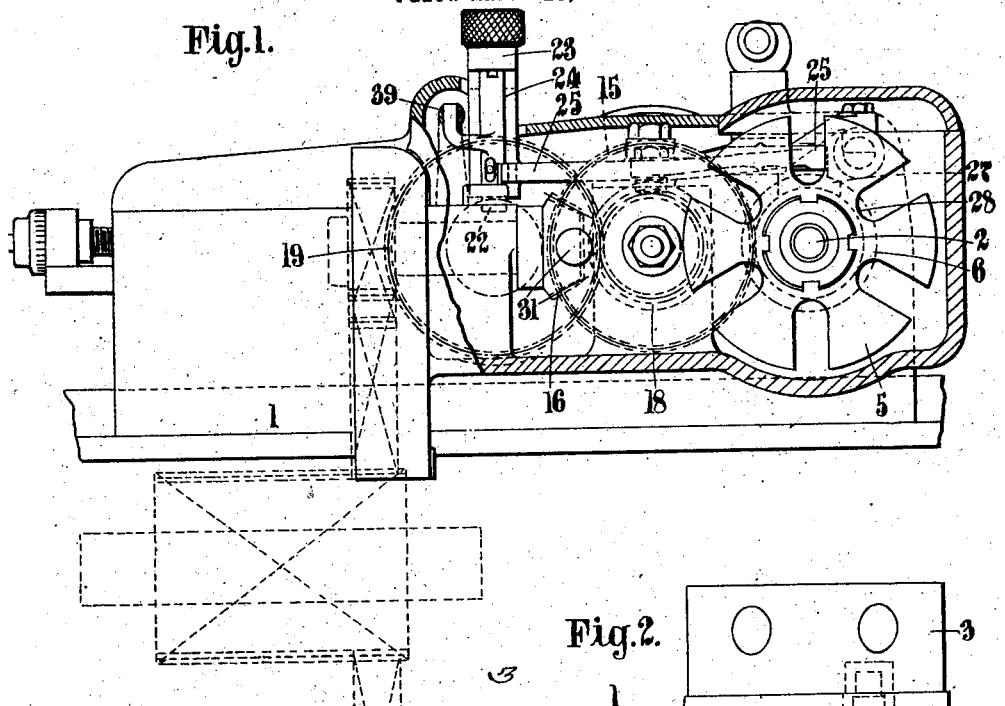
Figure 1 is a part sectional side elevation of a turret slide constructed in accordance with and embodying the features of this invention.

On the front part of the turret slide 1, is mounted in suitable bearings a transverse spindle 2 having fixed to its outer end a turret head 3, and on the said spindle are slidably mounted a pair of radially slotted discs 4 and 5, formed or fitted on the ends of a central sleeve part 6 having internal ribs 7 (Figure 4) which are arranged to slidably engage with longitudinal grooves 8 formed in the sleeve part 9 (Figure 5) which is fixed to the turret spindle 2. On the turret slide 1, rearwardly of the turret spindle 2 is mounted a crank shaft 10 to which is fixed a plate 11 having a crank 12 engaged by a connecting rod 13, which latter is adapted in known manner to be operated by suitable mechanism arranged to intermittently impart a single revolution to the crank shaft 10. A pair of bevel pinions 14 and 15 are mounted on the crank shaft 10 and their peripheries extend between the radially slotted discs on the turret spindle. The pinion 14 is fixed or keyed to the shaft 10, and the pinion 15 is loosely carried thereon. The pinions 14 and 15 are engaged by an intermeshing pinion 16 which is driven by suitable gearing mounted in the gear box 17 and slidably meshing with a long pinion connected with the driving mechanism, as seen in dotted lines in Figures 1 and 2, to permit a reciprocating movement to be imparted in known manner to the turret slide 1. On the crank shaft 10 is also mounted a pinion 18 which meshes with a large pinion 19, the ratio of the said gear train being two to one, and on the sleeve part 20 of the pinion 19 is formed a cam groove 21 (Figures 7 and 8) which is engaged by a cam bowl 22 mounted on the end of a plunger 23 slidably carried in a sleeve part 24 formed on the end of a rocking lever 25 pivoted to the upper side of the bearing lug 26 which is arranged to support one end of the crank shaft 10, the forward end of the said lever 25 being provided with a pivoted pad or saddle piece 27 which engages with an annular groove 28 in the sleeve part 6 which is slidably keyed on the turret spindle 2 and carries the radially slotted discs 4 and 5 on the turret spindle 2. The aforesaid pinion 19 and cam sleeve 20 rotate on a shaft 30 supported by a bracket or lug 29 fixed to the turret slide 1 as seen in Figures 2 and 3.

Figure 2:
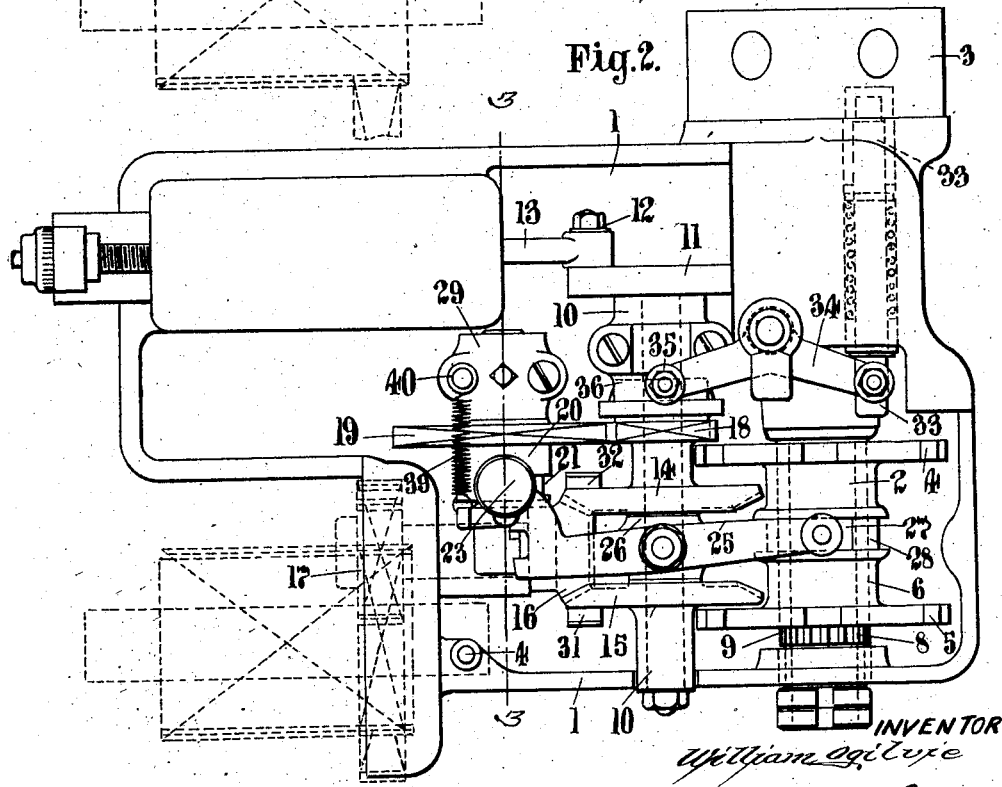
Figure 2 is a plan view, with the cover plate removed.
Figure 3:
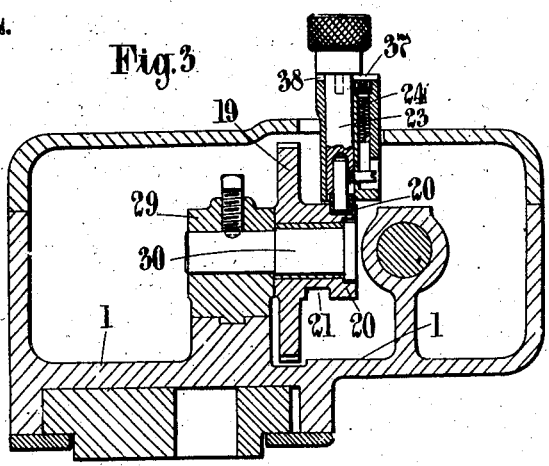
Figure 3 is a transverse section taken on line 3—3 Figure 2.

The cam groove 21 in the cam sleeve 20, as seen in Figures 7 and 8, is formed and adapted to impart one back and forth rocking movement to the disc operating lever 25 during two revolutions of the crank shaft 10, whereby the disc 5 may first be moved to the position shown in Figure 2, in which it aligns with a crank or projection 31 on the outer face of the bevel pinion 15 and then moves longitudinally in an opposite direction whereby the disc 4 is brought into alignment with the crank or projection 32 on the bevel pinion 14.

It will be readily understood that, during the aforesaid cycle of movements, owing to the fact that the bevel pinions 14 and 15 on the crank shaft 10 are rotating in opposite directions, when the crank or projection 31 on the bevel pinion 15 enters one of the radial slots in the disc 5 slidably keyed to the turret head spindle 2, the latter has imparted thereto a part turning movement whereby a tool in the turret head 3 is brought into operative position in relation to the stock or work piece, and, when one of the cranks or projections 32 on the pinion 14 enters one of the radial slots of the disc 4 the turret head spindle 2 will have imparted to it a part turning movement in an opposite direction, thus moving a second tool in the turret head 3 into position for engagement with the stock or work piece.

The turret head 3 is fixed or locked, when a tool is brought into operative position, by a spring pressed bolt 33 which engages with one of a series of holes in the inner face of same, and the said bolt 33 is adapted to be withdrawn to permit of the turning of the turret head 3, by means of a pivoted rocking lever 34 having one arm attached to the bolt 33 and its other arm 35 provided with a cam bowl or wiper engaged by a cam 36 mounted on the crank shaft 10, during each revolution of the latter, which, as previously explained, corresponds to one step or movement of the turret head.

The aforesaid mechanism for imparting a one step back and forth movement to the turret head 3, may be made inoperative, to permit a continuous intermittent rotary movement to be imparted to the turret head, so that any desired number of tools may be successively moved into operative position. This may be effected by lifting the plunger 23 in its sleeve or housing 24 in the rocking lever 25 so that its cam bowl 22 is raised clear of engagement with the cam groove 21 in the cam sleeve 20 on the pinion 19 which is driven by the pinion 18 on the crank shaft 10, and the said plunger is held in its raised or inoperative position by a part turning movement of the said plunger, whereby the peg 37 thereon, which has been withdrawn from one of the recesses 38 in the upper part of the sleeve 24, can then rest on the upper face thereof, thus holding the plunger in its raised position.

When the machine is set, in the manner as above described, to impart an intermittent rotary movement to the turret head, the mechanism is adapted to rotate the latter in a forward or backward direction, as may be best suited to the work under treatment, and this is effected by the fixed disposition of either of the radially slotted discs 4 and 5 in relation to the cranks or projections 31 and 32 respectively formed on the bevel pinions 15 and 14 mounted on the crank shaft 10. The disks 4 and 5 are held in either desired position by the spring 39 which is attached to the end of the rocking lever 25 and anchored to either one of the pegs 40 and 41 secured to the turret slide 1. When the spring is attached to the peg 40 as seen in Figure 2, and the cam bowl 22 carried by the lever 25 has been raised clear of engagement with the cam groove 21, the spring 39, through the rocking lever 25 would move the sleeve 6 carrying the slotted discs 4 and 5, to an outward position along the turret spindle thus moving and holding the disc 4 in alignment with the crank pin 32 on the bevel pinion 14 and a backward intermittent rotary movement would then be imparted to the turret head 3. Transferring the spring from the attachment peg 40 to the peg 41 will cause the rocking lever 25 to move the disc sleeve 6 inward to the position shown in Figure 2, thus bringing and holding the slotted disc 5 in alignment with crank pin 31 on the bevel pinion 15, when an intermittent forward rotary movement would be transmitted to the turret head 3.

Having fully described my invention, what I desire to claim and secure by Letters Patent is:—

1. A machine of the character described comprising a turret-head spindle, a pair of members splined on said spindle and simultaneously shiftable lengthwise thereof, a pair of members mounted to rotate in opposite directions on an axis parallel to said spindle, one of said second-named members adapted to engage and impart partial rotation to one of the first-named members when the said first-named members are shifted toward one end of said spindle and the other of said second-named members adapted to engage and impart partial rotation to the other of said first-named members when said first-named members are shifted toward the opposite end of the spindle, means for rotating said second-named members in opposite directions, and means operative in timed relation to the rotation of said second-named members for alternately shifting said first-named members toward opposite ends of said spindle.

2. A machine of the character described comprising a turret-head spindle, a pair of radially slotted discs slidably keyed on said spindle, a pair of cranks rotatable on an axis parallel to said spindle and extending between said discs, means for rotating said cranks in opposite directions, and means associated with said crank actuating means for alternately shifting said discs toward opposite ends of said spindle to first cause one of said cranks to enter a slot of one of said discs for imparting a partial rotation to said spindle in one direction and then to cause the other crank to enter a slot of the other disc for imparting a partial rotation to said spindle in the opposite direction.

3. A machine according to claim 1 wherein the means for shifting the first-named members toward opposite ends of the spindle comprises a lever of which one end engages the first-named members and a rotatable cam engaging and rocking said lever in timed relation to the rotation of the second-named members.

4. In a machine according to claim 2, means for rendering the disc-shifting means inoperative to permit one of the cranks to repeatedly engage one of the discs and repeatedly impart a partial rotation to said shaft.

5. A machine of the character described, comprising a rotatable turret-head spindle, a pair of spaced connected members slidably keyed on said spindle, a pair of driving members rotating in opposite directions on an axis parallel to said first-named members and adapted, respectively, to alternately engage and impart rotation to said first-named members, respectively, when said first-named members are shifted toward opposite ends of said spindle, and means operative in timed relation to the rotation of said driving members for shifting said first-named members toward opposite ends of said spindle, said means comprising a rotatable cam and a lever engaging said first-named members and having means extending into the path of the face of said cam.

6. A machine according to claim 5 wherein the means carried by the lever for engagement by the cam may be moved out of the path of the face of the cam to prevent shifting of the first-named members on the spindle.

7. A machine according to claim 1 wherein the means for alternately shifting the first-named members toward opposite ends of the spindle comprises a lever engaging the first-named members, a spring associated with said lever and adapted to be selectively mounted relatively to said lever as to tend to rock said lever in either direction, and a rotatable cam engaging said lever for rocking said lever in the opposite direction.

In testimony whereof I have hereunto set my hand.

WILLIAM OGILVIE.